US006664205B2

(12) United States Patent
Oda et al.

(10) Patent No.: US 6,664,205 B2
(45) Date of Patent: Dec. 16, 2003

(54) POROUS, SOUND-ABSORBING CERAMIC MOLDINGS AND METHOD FOR PRODUCTION THEREOF

(75) Inventors: Kazuo Oda, Yamaguchi (JP); Noriho Oda, Yamaguchi (JP); Nobuaki Miyao, Neyagawa (JP)

(73) Assignee: Oda Construction Co., Ltd., Yamaguchi (JP)

( * ) Notice: Subject to any disclaimer, the term of this patent is extended or adjusted under 35 U.S.C. 154(b) by 21 days.

(21) Appl. No.: 10/148,633

(22) PCT Filed: Oct. 17, 2001

(86) PCT No.: PCT/JP01/09108

§ 371 (c)(1), (2), (4) Date: Jun. 4, 2002

(87) PCT Pub. No.: WO02/32833

PCT Pub. Date: Apr. 25, 2002

(65) Prior Publication Data

US 2002/0193234 A1 Dec. 19, 2002

(30) Foreign Application Priority Data

Oct. 17, 2000 (JP) ......................................... 2000-317234

(51) Int. Cl.[7] ........................... C04B 38/00; C04B 38/08
(52) U.S. Cl. .............................. 501/80; 501/85; 252/62; 264/63
(58) Field of Search ............................. 252/62; 501/80, 501/85; 264/43

(56) References Cited

U.S. PATENT DOCUMENTS 5,827,457 A * 10/1998 Tseng ........................... 264/43
6,177,024 B1 * 1/2001 Sandoval et al. ............. 252/62

FOREIGN PATENT DOCUMENTS

JP  4-240168   * 8/1992
JP  11-049585  * 2/1999

* cited by examiner

Primary Examiner—Karl E Group
(74) Attorney, Agent, or Firm—Kanesaka & Takeuchi

(57) ABSTRACT

The present invention is a porous sound-absorbing ceramic form made of a porous ceramic material with communicating pores and having a bulk specific gravity of 0.5 to 1.0. The porous ceramic material consists essentially of 100 parts by weight of perlite having a particle diameter of 0.50 to 2.0 mm, 100 to 200 parts by weight of at least one sintered material selected from the group consisting of fly ash, chamotte, wollastonite, slag, silica, volcanic ejecta, rock, and clay mineral as a matrix material, and 10 to 20 parts by weight of an inorganic binder, which have been sintered so that the matrix material, together with the binder, surrounds the perlite particles. The perlite particles form communicating openings at mutually contacting portions thereof, so that the internal pores are communicating pores.

The present invention provides low-cost porous sound-absorbing ceramic forms, such as sound-absorbing bricks and tiles, which exhibit excellent sound-absorbing characteristics over a wide frequency range from low frequencies to high frequencies.

19 Claims, 3 Drawing Sheets

F I G. 1
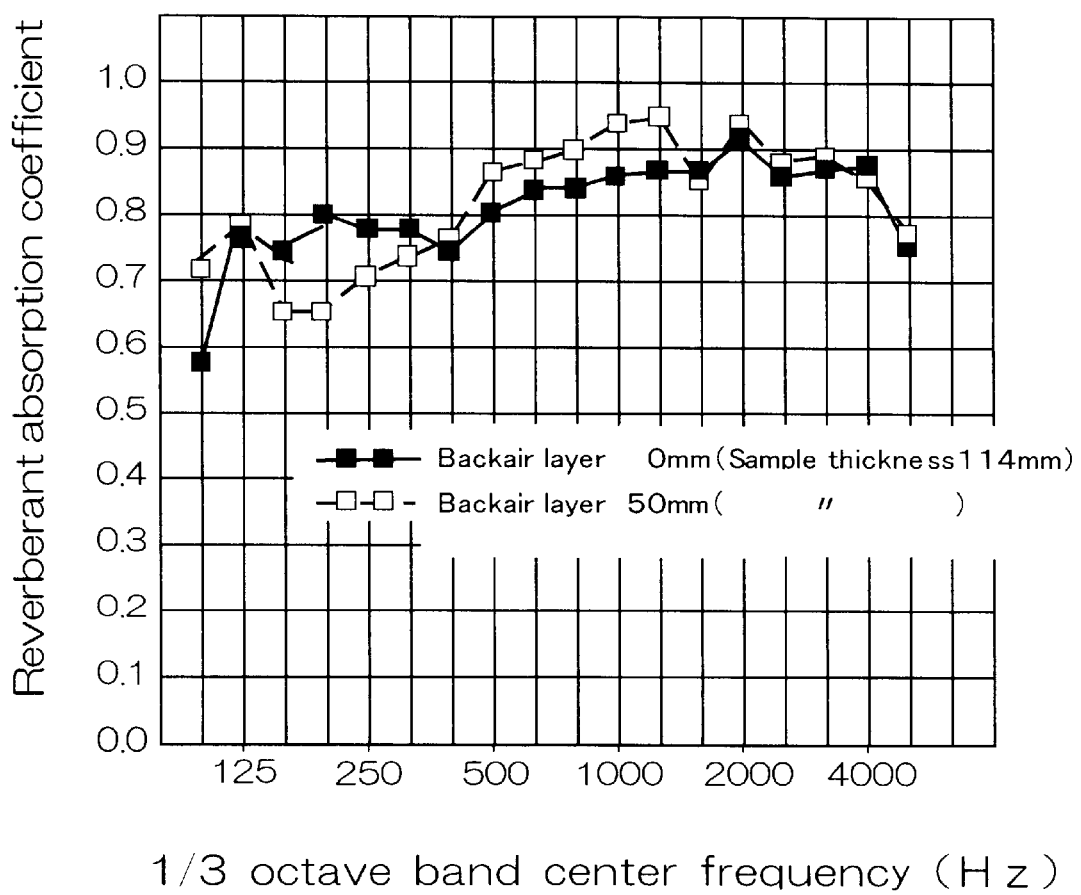

POROUS, SOUND-ABSORBING CERAMIC MOLDINGS AND METHOD FOR PRODUCTION THEREOF

This application is a 371 of PCT/JP01/09108, filed Oct. 17, 2001.

TECHNICAL FIELD OF THE INVENTION

The present invention relates to porous sound-absorbing ceramic forms such as porous sound-absorbing bricks, tiles and other plate-shaped materials produced from perlite as a main raw material. The present invention also relates to a method of producing such porous sound-absorbing ceramic forms.

BACKGROUND ART

Sound-absorbing materials constituting soundproofing walls used for roads, buildings, etc. are demanded to absorb sound in the frequency range of 400 to 4000 Hz, which human beings are likely to feel to be a loud noise. It is particularly demanded to absorb sound in the frequency range of 800 to 2000 Hz.

Sound-absorbing materials containing mineral fiber such as glass wool or rock wool have heretofore been known as typical sound-absorbing materials. The mineral fiber-containing sound-absorbing materials suffer, however, from some disadvantages. That is, when the mineral fiber-containing sound-absorbing materials contain water, the sound-absorbing performance is markedly degraded. In addition, because they are made of fibers, the mineral fiber-containing sound-absorbing materials may become deformed with time and are likely to be scattered or peeled off by a high-speed air stream. Further, the resin material contained as a binder may be deteriorated by ultraviolet rays.

To overcome the disadvantages, the conventional practice is to cover the mineral fiber-containing sound-absorbing materials with resin films and to accommodate them in metallic containers. However, this causes the cost to increase considerably.

A sound-absorbing material consisting of gypsum board provided with a large number of through-holes is also well known. However, the sound-absorbing material consisting of perforated gypsum board has the following problem. The gypsum board does not have sound-absorbing performance but absorbs sound energy by resonance in the through-holes. Therefore, the sound-absorbing material can absorb sound only at specific frequencies. To solve this problem, the conventional practice is to provide an air layer at the back of the gypsum board or to install a backing material, e.g. glass wool, on the back of the gypsum board. These methods, however, require a great deal of time and labor for construction.

Meanwhile, ceramic tiles and bricks made by firing silicate minerals have heretofore been used as building materials, furnace materials and so forth. Moreover, various ceramic materials are being used for noise control measures in urban and industrial environments.

However, low-cost ceramic materials having excellent sound-absorbing qualities have not yet been provided, and hence no reduction in the cost of construction has yet been attained.

DISCLOSURE OF THE INVENTION

In view of the above-described conventional circumstances, the present invention provides low-cost porous sound-absorbing ceramic forms, such as sound-absorbing bricks and tiles, which have good weatherability and exhibit excellent sound-absorbing characteristics over a wide frequency range from low frequencies to high frequencies which human beings feel to be a loud noise.

That is, the present invention provides porous sound-absorbing ceramic forms and methods of producing the same, which have the following structures and arrangements.

(1) A porous sound-absorbing ceramic form made of a porous ceramic material with communicating pores and having a bulk specific gravity of 0.3 to 1.5, wherein the porous ceramic material consists essentially of 100 parts by weight of perlite having a particle diameter of 0.10 to 8.0 mm, 80 to 250 parts by weight of at least one sintered material selected from the group consisting of fly ash, slag, silica, volcanic ejecta, rock, and clay mineral as a matrix material, and 5 to 30 parts by weight of an inorganic binder, which have been sintered so that the matrix material, together with the binder, surrounds the perlite particles, and wherein the perlite particles form communicating openings at mutually contacting portions thereof, so that the internal pores are communicating pores.

(2) A porous sound-absorbing ceramic form made of a porous ceramic material with communicating pores and having a bulk specific gravity of 0.5 to 1.0, wherein the porous ceramic material consists essentially of 100 parts by weight of perlite having a particle diameter of 0.50 to 2.0 mm, 100 to 200 parts by weight of at least one sintered material selected from the group consisting of fly ash, chamotte, wollastonite, slag, silica, volcanic ejecta, rock, and clay mineral as a matrix material, and 10 to 20 parts by weight of an inorganic binder, which have been sintered so that the matrix material, together with the binder, surrounds the perlite particles, and wherein the perlite particles form communicating openings at mutually contacting portions thereof, so that the internal pores are communicating pores.

(3) A porous sound-absorbing ceramic form made of a porous ceramic material with communicating pores and having a bulk specific gravity of 0.5 to 1.0, a bending strength of 10 to 28 $kgf/cm^2$ and a compressive strength of 40 to 90 $kgf/cm^2$, wherein the porous ceramic material consists essentially of 100 parts by weight of perlite having a particle diameter of 0.50 to 2.0 mm, 100 to 200 parts by weight of sintered fly ash as a matrix material, and 10 to 20 parts by weight of an inorganic binder, which have been sintered so that the matrix material, together with the binder, surrounds the perlite particles, and wherein the perlite particles form communicating openings at mutually contacting portions thereof, so that the internal pores are communicating pores.

(4) A porous sound-absorbing ceramic form as stated in any one of the above paragraphs (1) to (3), wherein the perlite is one obtained by fire-expanding ground pearlite, obsidian or pitchstone.

(5) A porous sound-absorbing ceramic form as stated in any one of the above paragraphs (1) to (4), wherein the matrix material contains 10 to 50 parts by weight of glass.

(6) A porous sound-absorbing ceramic form as stated in any one of the above paragraphs (1) to (5), wherein the perlite and/or the matrix material has been crystallized by addition of a nucleation agent for crystallization.

(7) A porous sound-absorbing ceramic form as stated in any one of the above paragraphs (1) to (6), wherein the matrix material further contains 1 to 10 parts by weight of at least one short fiber material selected from the group consisting of metallic fiber, glass fiber, carbon fiber, ceramic fiber, mineral fiber, and whisker.

(8) A porous sound-absorbing ceramic form as stated in any one of the above paragraphs (1) to (7), which is brick.

(9) A porous sound-absorbing ceramic form as stated in any one of the above paragraphs (1) to (7), which is tile of other plate-shaped material.

(10) A method of producing a porous sound-absorbing ceramic form made of a porous ceramic material with communicating pores and having a bulk specific gravity of 0.3 to 1.2, the method including the steps of: mixing together 100 parts by weight of perlite having a particle diameter of 0.10 to 3.5 mm, 100 to 250 parts by weight of at least one powder selected from the group consisting of fly ash, chamotte, wollastonite, slag, silica, volcanic ejecta, rock, sludge, and clay mineral, 5 to 30 parts by weight of a binder, and 10 to 50 parts by weight of water; forming the resulting mixture into a predetermined shape, followed by drying; and firing the mixture at 900 to 1200° C.

(11) A method of producing a porous sound-absorbing ceramic form made of a porous ceramic material with communicating pores and having a bulk specific gravity of 0.5 to 1.2, the method including the steps of: mixing together 100 parts by weight of perlite having a particle diameter of 0.50 to 2.0 mm, 35 to 60 parts by weight of at least one powder selected from the group consisting of fly ash, chamotte, wollastonite, slag, silica, volcanic ejecta, rock, sludge, and clay mineral, 10 to 25 parts by weight of a binder, and 20 to 45 parts by weight of water; pressing the resulting mixture in a frame mold with a predetermined shape under a pressure of 8 to 15 $kgf/cm^2$, followed by drying; and firing the mixture at 950 to 1150° C.

(12) A method of producing a porous sound-absorbing ceramic form made of a porous ceramic material with communicating pores and having a bulk specific gravity of 0.5 to 1.0, a bending strength of 15 to 28 $kgf/cm^2$ and a compressive strength of 40 to 90 $kgf/cm^2$, the method including the steps of: mixing together 100 parts by weight of perlite having a particle diameter of 0.50 to 2.0 mm, 35 to 60 parts by weight of fly ash, 10 to 25 parts by weight of a binder, and 20 to 45 parts by weight of water; pressing the resulting mixture in a frame mold under a pressure of 8 to 15 $kgf/cm^2$, followed by drying; and firing the mixture at 950 to 1150° C.

(13) A method of producing a porous sound-absorbing ceramic form as stated in any one of the above paragraphs (10) to (12), wherein the binder is water glass.

(14) A method of producing a porous sound-absorbing ceramic form as stated in any one of the above paragraphs (10) to (13), wherein a nucleation agent for crystallization of glass is added to the mixture.

(15) A method of producing a porous sound-absorbing ceramic form as stated in the above paragraph (14), wherein an annealing treatment for promoting the crystallization of glass is performed after the firing of the body.

(16) A method of producing a porous sound-absorbing ceramic form as stated in any one of the above paragraphs (10) to (15), wherein the binder contains an organic binder.

(17) A method of producing a porous sound-absorbing ceramic form as stated in any one of the above paragraphs (10) to (16), wherein the body is formed by further adding 5 to 10 parts by weight of at least one selected from the group consisting of metallic fiber, glass fiber, carbon fiber, ceramic fiber, mineral fiber, organic fiber and whisker to 100 parts by weight of fly ash powder having a particle diameter of 5 to 50 μm.

(18) A method of producing a porous sound-absorbing ceramic form as stated in any one of the above paragraphs (10) to (17), wherein the porous sound-absorbing ceramic form is brick.

(19) A method of producing a porous sound-absorbing ceramic form as stated in any one of the above paragraphs (10) to (17), wherein the porous sound-absorbing ceramic form is tile of other plate-shaped material.

BRIEF DESCRIPTION OF THE DRAWINGS

FIG. 1 is a graph showing the sound-absorbing characteristics of porous sound-absorbing bricks obtained by an example of the present invention.

EXPLANATION OF REFERENCE NUMERALS

Figure 2:
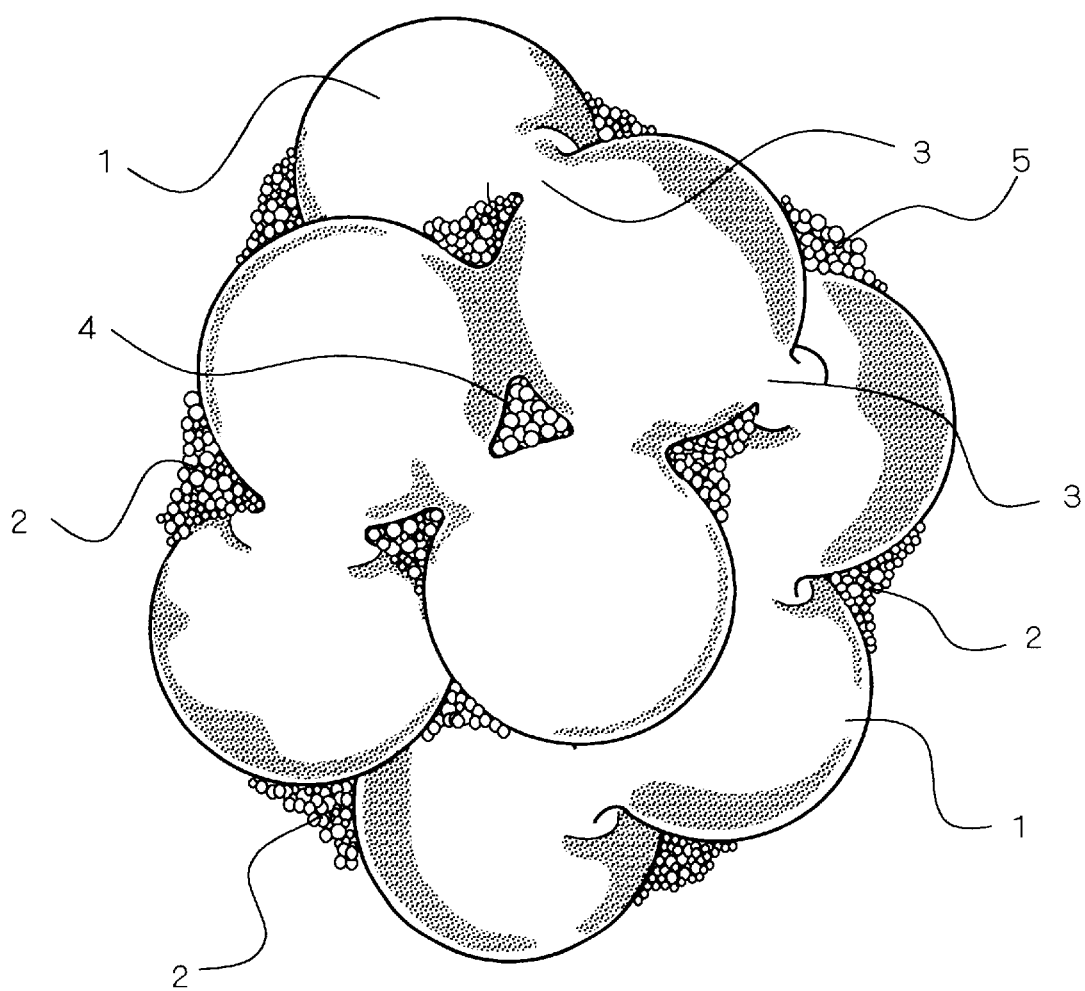
FIG. 2 is an enlarged view illustrating the external appearance of a porous sound-absorbing ceramic form obtained by an example of the present invention.

1: perlite
2: fly ash
3: communicating openings between perlite particles
4: gaps formed between perlite particles
5: fine gaps formed between fly ash particles in matrix

BEST MODE FOR CARRYING OUT THE INVENTION

Embodiments of the present invention will be described below.

Perlite used as a main raw material in the invention of this application is generally obtained by firing ground obsidian, pearlite, pitchstone or the like at about 850 to 1100° C. When heated, such ground material is expanded into hollow spherical particles by the pressure of gasification of mainly the water content. Because it is a silica-alumina ceramic material, perlite has considerably high refractoriness despite its lightweight structure. Perlite also has high mechanical strength in comparison to glass balloons and the like. It should be noted that foamed shirasu may be used in place of perlite.

Fly ash, chamotte, wollastonite, slag, silica, volcanic ejecta, rock, and clay mineral, which may be used as a raw material of the matrix material, all become sintered materials having considerably high refractoriness and mechanical strength upon firing. Accordingly, porous sound-absorbing ceramic forms resulting from these materials provide products having sufficiently high refractoriness to withstand a fire and like.

For example, fly ash is the residual ash from the combustion of coal, petroleum pitch, etc., which is discharged in large quantities from thermal power plants and so forth. There are few available techniques of utilizing fly ash, and the amount of fly ash used is small. Therefore, the utilization of fly ash is presently examined exhaustively in various fields. Above all, a fine fly-ash powder having a particle diameter of 5 to 50 μm is preferably used.

For example, fly ash has a composition consisting essentially of 50 to 68% of $SiO_2$, 20 to 35% of $Al_2O_3$, 2 to 7% of $Fe_2O_3$, 0.6 to 7% of CaO, 0.2 to 2% of MgO, 0.1 to 2% of $Na_2O$, 0.3 to 1.5% of $K_2O$, and 2 to 4% of Ig.loss. The fly ash is amorphous, and each fly-ash particle is a hollow spherical particle having a diameter of 5 to 50 μm.

Accordingly, the fly-ash particles has excellent rollability and superior packability and also exhibits excellent sinterability.

In the production of porous sound-absorbing ceramic forms according to the invention of this application, first, perlite particles are mixed with fine fly-ash powder or the like to impart formability, and a small amount of binder, e.g. cornstarch, CMC, or water glass, is added to the mixture. Thereafter, the mixture is pressed into a desired shape, e.g. brick or tile.

It should be noted that the binder used for the pressing process is usually an organic binder, e.g. cornstarch, CMC, sodium alginate, PVA, a polyacrylic emulsion, or a polyhydric alcohol wax. However, an inorganic material gel, e.g. water glass or alumina gel, is preferably used as a binder also serving as a sintering agent for sintering perlite and fly-ash particles, by way of example. It should be noted that a mixture of water glass, silica gel or alumina gel as an inorganic binder and a small amount of fine glass powder is also usable as a preferred binder.

In addition, it is preferable to add a nucleation agent for crystallizing the glassy phase to further increase the strength. It is possible to use a publicly known nucleation agent used in the production of crystallized glass, e.g. fluorite, silver, gold, titania, or zirconia.

When the crystallization agent is added in the production process, temperature control should be performed during cooling after firing by an annealing treatment according to a cooling temperature pattern for producing favorable crystallization in accordance with the conventional method.

Consequently, porous sound-absorbing ceramic forms having markedly increased product strength are provided.

Further, it is possible in the present invention to add various fibers, e.g. metallic fiber, glass fiber, carbon fiber, various kinds of ceramic fibers, or whisker for the purpose of reinforcement and electromagnetic wave absorption.

Regarding the particle size of raw materials used in the invention of this application, the raw materials are preferably in the form of finely divided powder. That is, the particle diameter of fly ash is preferably in the range of 5 to 50 $\mu$m. The particle diameter of wollastonite (calcium silicate) is preferably in the range of 40 to 70 $\mu$m. The particle diameter of fine blast furnace slag powder is preferably in the range of 10 to 100 $\mu$m. The particle diameter of fine silica powder is preferably not larger than 1 $\mu$m.

In particular, a binder containing water glass (aqueous sodium silicate solution) promotes greatly the dissolution and gelation of the particle surfaces of the fly-ash powder material and exhibits the action of firmly sintering the powder particles to each other as the sintering temperature rises while thoroughly wrapping the particles. Thus, the binder serves as a firm bonding component for forming a ceramic body manifesting sufficiently high strength at a firing temperature of 850 to 1200° C.

For the adjustment of the viscosity of the binder containing water glass, it is preferable to add clay mineral, e.g. fine kaolin powder, to the binder.

EXAMPLES

Examples of the production of porous sound-absorbing bricks as porous sound-absorbing ceramic forms according to an example of the present invention will be described below.

Example 1

[Raw Materials Used]

| | |
|---|---|
| A. Perlite (fire-expanded obsidian particles; average particle diameter: 1.5 mm) | 100 parts by weight |
| B. Fly ash (average particle diameter: 20 $\mu$m) | 167 parts by weight |
| C. Water glass (Baumé degree: 36°; specific gravity: 1.333) | 67 parts by weight |

[Production Process]

In the production of porous sound-absorbing bricks according to the present invention: (1) the body for forming was prepared from the above-described raw materials; (2) the body was formed into a brick shape; (3) the green body was dried; and (4) the dried green body was fired to produce a porous sound-absorbing brick.

(1) In the preparation of the body for forming, first, 55.7 parts by weight of fly ash (B) was added to 100 parts by weight of perlite (A; total weight), and the raw materials were mixed together for 2 minutes in a concrete mixer.

(a) While the above-described mixing was continued (for 2 minutes), 22.3 parts by weight of water glass (C) was sprayed over the mixture to form a granular material having an average particle diameter of 1.7 mm, in which fly ash adhered to the surfaces of perlite particles (i.e. the perlite particle surfaces were covered with fly ash and water glass).

(b) While the mixing was further continued (for 2 minutes), 55.7 parts by weight of fly ash (B) was added onto the granules and 22.3 parts by weight of water glass (C) was sprayed thereover to form a granular material having an average particle diameter of 1.9 mm, in which fly ash further adhered to the surfaces of the granules obtained at the above step (a).

(c) While the mixing was further continued (for 2 minutes), 55.7 parts by weight of fly ash (B) was added onto the granules and 22.3 parts by weight of water glass (C) was sprayed thereover to form a granular material having an average particle diameter of 2.1 mm, in which fly ash adhered to the surfaces of the perlite granules obtained at the above step (b). The water content of the granular material obtained by this process was 13%. Accordingly, the granular material was usable as the body for semi-dry forming.

(2) In the forming process, the body of the granular material obtained as stated above was cast into molds and pressed under 10 kgf/cm² to obtain brick-shaped green bodies.

(3) In the drying process, the above-described green bodies were dried in a drying oven for 3 hours at 55° C. The dried green bodies were rough-cut at the edges thereof.

(4) Thereafter, the green bodies were heated in a kiln for firing at a heating rate of 2.1 to 2.3° C./min. and maintained at 750° C. for 2.5 hours. Thereafter, the temperature was raised to 1100° C., and the green bodies were maintained at this temperature for 3 hours. Thereafter, the fired bodies were slowly cooled down to 600° C. at a cooling rate of 4° C./min. and further down to 400° C. at 3° C./min. and then allowed to cool down to room temperature.

[Characteristics of Products]

The fired bodies obtained through the cooling process were lightweight and porous products with open pores and substantially no closed pores, which had a compressive strength of 42.0 kgf/cm², a bending strength of 14.6 kgf/cm² and a bulk specific gravity of 0.7.

The sound-absorbing characteristics of the porous sound-absorbing bricks produced by the above-described method were measured. The results of the measurement are shown in FIG. 1. Bricks having a thickness of 114 mm were used as specimens. FIG. 1 shows the measured values concerning a brick without a back air layer (0 mm) and a brick with a back air layer (50 mm).

As shown in FIG. 1, the reverberant absorption coefficient at ⅓ octave band center frequencies of 125 to 4000 Hz assumed high values of 0.75 to 0.8 in a low frequency region of 125 to 250 Hz even if no back air layer was provided. The reverberant absorption coefficient assumed high numerical values of 0.75 to 0.9 over a wide frequency range of 125 to 4000 Hz.

The conventional practice is to increase the back air layer in size in order to increase the sound absorption coefficient. However, the porous sound-absorbing brick according to the present invention has been proved to be usable as a sound-absorbing material exhibiting excellent sound-absorbing characteristics over a wide frequency range from low frequencies to high frequencies without the need of a back air layer.

Figure 3:
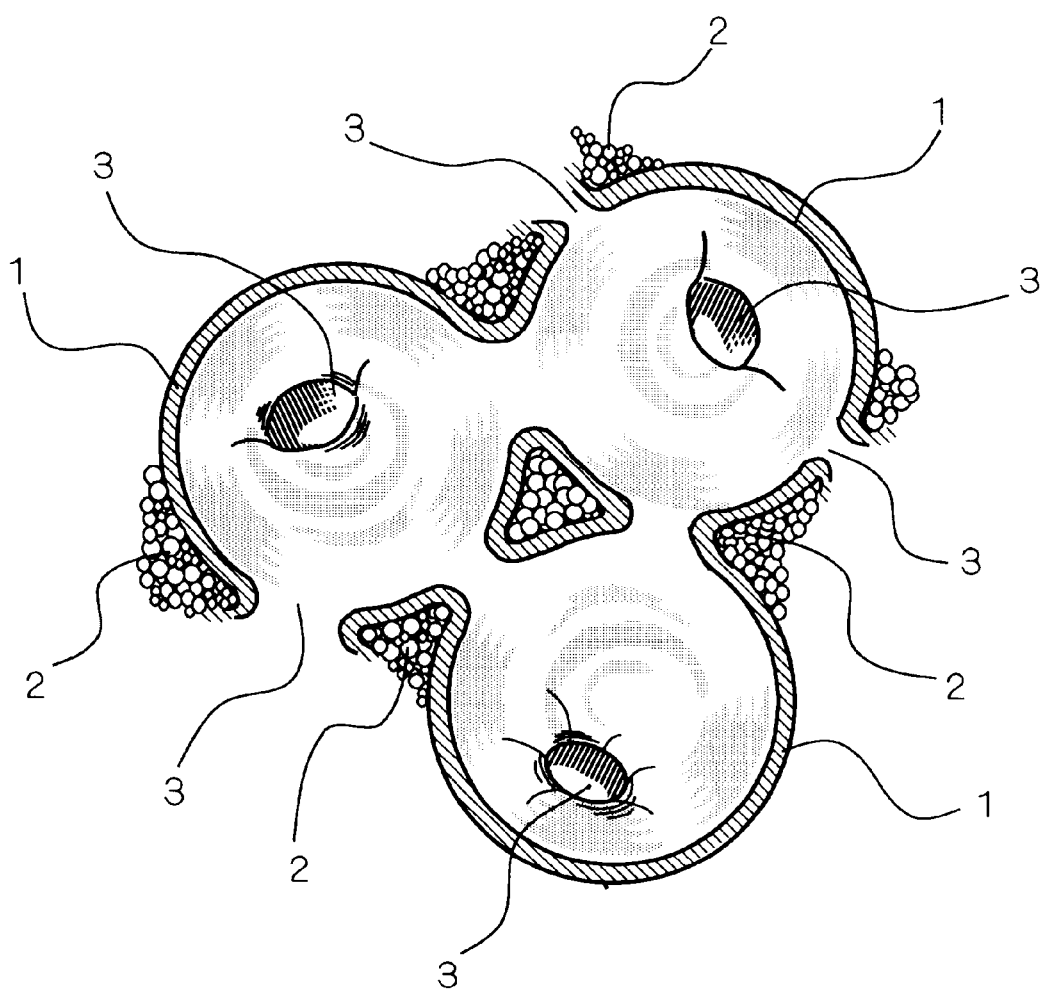
FIG. 3 is an enlarged sectional view illustrating a porous sound-absorbing ceramic form obtained by an example of the present invention.

FIGS. 2 and 3 show the grain structure and the condition of communicating pores of the porous sound-absorbing brick (porous sound-absorbing ceramic form) produced by the above-described method.

FIG. 2 is an enlarged view illustrating the external appearance of the porous sound-absorbing ceramic form, and FIG. 3 is an enlarged sectional view illustrating the porous sound-absorbing ceramic form. As shown in the figures, perlite particles 1 are surrounded by a matrix comprising sintered fly ash 2 accompanied by a binder. Moreover, the perlite particles 1 communicate with each other through communicating openings 3.

It is surmised that the communicating openings 3 are formed as follows. As the perlite particles 1 are heated, the pressure of water vapor and other gas in the hollow insides of the perlite particles 1 increases. When the perlite particles 1 reach a high temperature close to the softening point or melting point thereof, the walls of the perlite particles 1 are broken through by the gas pressure at mutually contacting portions of the perlite particles 1. As a result, communicating openings 3 are formed. The temperature at which such communicating openings are formed depends on the kind of perlite. However, it is preferably in the range of 900° C. to 1200° C., particularly preferably in the range of 1000° C. to 1150° C.

Communicating pores are formed by (1) communicating openings 3 between perlite particles 1, (2) gaps 4 formed between perlite particles 1, and (3) fine gaps 5 formed between fly-ash particles in the matrix.

Example 2

In this example of the invention, porous sound-absorbing bricks were produced in the same way as in Example 1. This example differs from Example 1 in that fine blast furnace slag powder was used as a raw material in place of fly ash, and the maximum firing temperature was set at 1120° C. for 3 hours instead of 1100° C. for 3 hours.

The sound-absorbing characteristics of porous sound-absorbing bricks obtained in this example were substantially the same as those of the porous sound-absorbing bricks obtained in Example 1. However, the compressive strength was slightly higher than in Example 1.

Example 3

In this example of the invention, porous sound-absorbing bricks were produced in the same way as in Example 1. This example differs from Example 1 in that a fine powder obtained by mixing together 80 parts by weight of fly ash (average particle diameter: 20 μm) and 20 parts by weight of fine blast furnace slag powder was used as the raw material B, and firing was performed at 1100° C. for 2 hours. As a result, the sound-absorbing characteristics of porous sound-absorbing bricks obtained in this example were substantially the same as those of the porous sound-absorbing bricks obtained in Example 1.

What is claimed is:

1. A porous sound-absorbing ceramic form made of a porous ceramic material with communicating pores and having a bulk specific gravity of 0.3 to 1.5, wherein the porous ceramic material consists essentially of 100 parts by weight of perlite having a particle diameter of 0.10 to 8.0 mm, 80 to 250 parts by weight of at least one sintered material selected from the group consisting of fly ash, slag, silica, volcanic ejecta, rock, and clay mineral as a matrix material, and 5 to 30 parts by weight of an inorganic binder, which have been sintered so that the matrix material, together with the binder, surrounds perlite particles, and wherein said perlite particles form communicating openings at mutually contacting portions thereof, so that internal pores are communicating pores.

2. A porous sound-absorbing ceramic form made of a porous ceramic material with communicating pores and having a bulk specific gravity of 0.5 to 1.0, wherein the porous ceramic material consists essentially of 100 parts by weight of perlite having a particle diameter of 0.50 to 2.0 mm, 100 to 200 parts by weight of at least one sintered material selected from the group consisting of fly ash, chamotte, wollastonite, slag, silica, volcanic ejecta, rock, and clay mineral as a matrix material, and 10 to 20 parts by weight of an inorganic binder, which have been sintered so that the matrix material, together with the binder, surrounds perlite particles, and wherein said perlite particles form communicating openings at mutually contacting portions thereof, so that internal pores are communicating pores.

3. A porous sound-absorbing ceramic form made of a porous ceramic material with communicating pores and having a bulk specific gravity of 0.5 to 1.0, a bending strength of 10 to 28 kgf/cm$^2$ and a compressive strength of 40 to 90 kgf/cm$^2$, wherein the porous ceramic material consists essentially of 100 parts by weight of perlite having a particle diameter of 0.50 to 2.0 mm, 100 to 200 parts by weight of sintered fly ash as a matrix material, and 10 to 20 parts by weight of an inorganic binder, which have been sintered so that the matrix material, together with the binder, surrounds perlite particles, and wherein said perlite particles form communicating openings at mutually contacting portions thereof, so that internal pores are communicating pores.

4. A porous sound-absorbing ceramic form according to claim 1, wherein the perlite is one obtained by fire-expanding ground pearlite, obsidian or pitchstone.

5. A porous sound-absorbing ceramic form according to claim 1, wherein the matrix material contains 10 to 50 parts by weight of glass.

6. A porous sond-absorbing ceramic form according to claim 1, wherein at least one of the perlite and the matrix material has been crystallized by addition of a nucleation agent for crystallization.

7. A porous sound-absorbing ceramic form according to claim 1, wherein the matrix material further contains 1 to 10 parts by weight of at least one short fiber material selected from the group consisting of metallic fiber, glass fiber, carbon fiber, ceramic fiber, mineral fiber, and whisker.

8. A porous sound-absorbing ceramic form according to claim 1, which is brick.

9. A porous sound-absorbing ceramic form according to claim 1, which is tile of other plate-shaped material.

10. A method of producing a porous sound-absorbing ceramic form made of a porous ceramic material with communicating pores and having a bulk specific gravity of 0.3 to 1.2, said method comprising the steps of:

mixing together 100 parts by weight of perlite having a particle diameter of 0.10 to 3.5 mm, 100 to 250 parts by weight of at least one powder selected from the group consisting of fly ash, chamotte, wollastonite, slag, silica, volcanic ejecta, rock, sludge, and clay mineral, 5 to 30 parts by weight of a binder, and 10 to 50 parts by weight of water;

forming a resulting mixture into a predetermined shape, followed by drying; and firing said mixture at 900 to 1200° C.

11. A method of producing a porous sound-absorbing ceramic form made of a porous ceramic material with communicating pores and having a bulk specific gravity of 0.5 to 1.2, said method comprising the steps of:

mixing together 100 parts by weight of perlite having a particle diameter of 0.50 to 2.0 mm, 35 to 60 parts by weight of at least one powder selected from the group consisting of fly ash, chamotte, wollastonite, slag, silica, volcanic ejecta, rock, sludge, and clay mineral, 10 to 25 parts by weight of a binder, and 20 to 45 parts by weight of water;

pressing a resulting mixture in a frame mold with a predetermined shape under a pressure of 8 to 15 kgf/cm$^2$, followed by drying; and firing said mixture at 950 to 1150° C.

12. A method of producing a porous sound-absorbing ceramic form made of a porous ceramic material with communicating pores and having a bulk specific gravity of 0.5 to 1.0, a bending strength of 15 to 28 kgf/cm$^2$ and a compressive strength of 40 to 90 kgf/cm$^2$, said method comprising the steps of:

mixing together 100 parts by weight of perlite having a particle diameter of 0.50 to 2.0 mm, 35 to 60 parts by weight of fly ash, 10 to 25 parts by weight of a binder, and 20 to 45 parts by weight of water;

pressing a resulting mixture in a frame mold under a pressure of 8 to 15 kgf/cm$^2$, followed by drying; and firing said mixture at 950 to 1150° C.

13. A method of producing a porous sound-absorbing ceramic form according to claim 10, wherein the binder is water glass.

14. A method of producing a porous sound-absorbing ceramic form according to claim 10, wherein a nucleation agent for crystallization of glass is added to the mixture.

15. A method of producing a porous sound-absorbing ceramic form according to claim 14, wherein an annealing treatment for promoting the crystallization of glass is performed after firing of the body.

16. A method of producing a porous sound-absorbing ceramic form according to claim 10, wherein the binder contains an organic binder.

17. A method of producing a porous sound-absorbing ceramic form according to claim 10, wherein the body is formed by further adding 5 to 10 parts by weight of at least one selected from the group consisting of metallic fiber, glass fiber, carbon fiber, ceramic fiber, mineral fiber, organic fiber and whisker to 100 parts by weight of fly ash powder having a particle diameter of 5 to 50 μm.

18. A method of producing a porous sound-absorbing ceramic form according to claim 10, wherein the porous sound-absorbing ceramic form is brick.

19. A method of producing a porous sound-absorbing ceramic form according to claim 10, wherein the porous sound-absorbing ceramic form is tile of other plate-shaped material.

* * * * *